United States Patent
Oertel et al.

(10) Patent No.: US 10,890,379 B2
(45) Date of Patent: Jan. 12, 2021

(54) AUTOMATIC QUICK RESPONSE TEMPERATURE MEASUREMENT FOR ROTARY KILNS

(71) Applicant: OUTOTEC (FINLAND) OY, Espoo (FI)

(72) Inventors: Nils Oertel, Frankfurt am Main (DE); Eugen Schmidt, Weiterstadt (DE); Andrej Schulakow-Klass, Wiesbaden (DE); Lothar Formanek, Frankfurt am Main (DE)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/798,579

(22) Filed: Feb. 24, 2020

(65) Prior Publication Data

US 2020/0191483 A1 Jun. 18, 2020

Related U.S. Application Data

(63) Continuation of application No. PCT/EP2018/070286, filed on Jul. 26, 2018.

(30) Foreign Application Priority Data

Aug. 31, 2017 (DE) .................. 10 2017 119 989

(51) Int. Cl.
| | |
|---|---|
| *F27B 7/42* | (2006.01) |
| *F27D 9/00* | (2006.01) |
| *G01K 7/02* | (2006.01) |
| *F27D 21/00* | (2006.01) |
| *F27D 19/00* | (2006.01) |

(52) U.S. Cl.
CPC ............... *F27B 7/42* (2013.01); *F27D 19/00* (2013.01); *F27D 21/0014* (2013.01); *G01K 7/02* (2013.01); *F27D 2019/0059* (2013.01)

(58) Field of Classification Search
CPC ........ G01K 1/146; G01K 13/08; F27D 19/00; F27B 7/42
See application file for complete search history.

(56) References Cited

FOREIGN PATENT DOCUMENTS

| | | |
|---|---|---|
| CN | 105067138 A | 11/2015 |
| CN | 105115612 A | 12/2015 |

(Continued)

OTHER PUBLICATIONS

"Geneva Wheel Mechanism", May 2016, http://gpusupercomputing.com/adarsh/Geneva.pdf (Year: 2016).*

(Continued)

*Primary Examiner* — Steven S Anderson, II
(74) *Attorney, Agent, or Firm* — Robert P. Michal, Esq.; Carter, DeLuca & Farrell LLP

(57) ABSTRACT

A device for measuring the temperature in a rotary kiln through which solid material passes being heated to elevated temperatures. The device features a drive as well as an elongated hollow body with means to fix a thermocouple, whereby the drive and the elongated hollow body are mounted such that they rotate jointly with the rotary kiln. The drive can move the elongated hollow body together with thermocouple through an opening in and out of the rotary kiln interior for measuring the temperature inside the rotary kiln during operation.

11 Claims, 6 Drawing Sheets

(56) References Cited

FOREIGN PATENT DOCUMENTS

Figure 1:
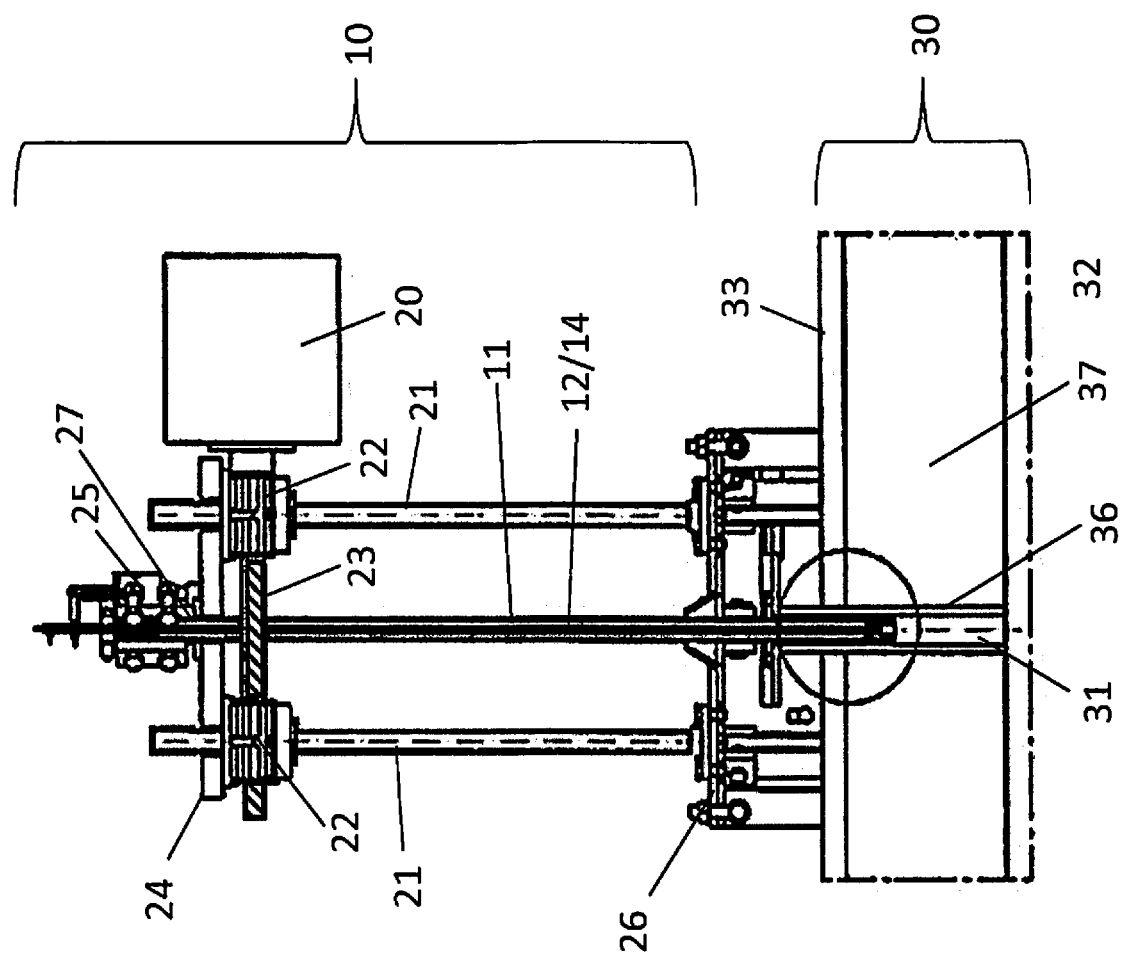

| CN | 105333968 | * | 2/2016 |
|---|---|---|---|
| CN | 105333968 A | | 2/2016 |

OTHER PUBLICATIONS

"Worm Gear Definition, Working and Applications", Aug. 2013, http://mechteacher.com/worm-gear/ (Year: 2013).*
International Search Report issued by the European Patent Office acting as the International Searching Authority in relation to International Application No. PCT/EP2018/070286 dated Oct. 16, 2018 (3 pages).
Written Opinion of the International Searching Authority issued by the European Patent Office acting as the International Searching Authority in relation to International Application No. PCT/EP2018/070286 dated Oct. 16, 2018 (8 pages).
International Preliminary Report on Patentability issued by the European Patent Office acting as the International Preliminary Examining Authority in relation to International Application No. PCT/EP2018/070286 dated Jul. 23, 2019 (6 pages).

* cited by examiner

AUTOMATIC QUICK RESPONSE TEMPERATURE MEASUREMENT FOR ROTARY KILNS

CROSS-REFERENCE TO RELATED APPLICATIONS

This application is a continuation of PCT International Application No. PCT/EP2018/070286 filed Aug. 31, 2017, which claims priority to German Patent Application No. 102017119989.6, filed Aug. 31, 2017, the disclosure of each of these applications is expressly incorporated herein by reference in their entirety.

The Invention is directed to a device for measuring the temperature in a rotary kiln through which material passes being heated to elevated temperatures. This invention also covers a rotary kiln equipped with said device and a process for measuring the inside temperature of the rotary kiln in situ.

Temperature measurements are of particular importance for each process control. Especially for continuous processes, these measurements have to be local and time resolved. For a rotary kiln, a pyroprocessing device used to thermally treat solid materials at high to extremely high temperatures (calcination or direct reduction) in a continuous process, such measurement is particularly challenging.

Commonly, thermocouples (mostly thermoelectric pyrometers) have been used which were fastened to the kiln shell and which rotate with the kiln. As e.g. disclosed in DE 1 473 305, radiation pyrometers are fixed on the kiln's shell. Further, it is possible the thermocouples are moved in and out of the rotary kiln's interior manually during operation of the rotary kiln. For a quick response temperature measurement (required for the determination of exact gas and solid material temperatures, dynamic angle of repose and filling degree) a hardly protected thermocouple with a very low live time has to be inserted.

According to the state of the art, the procedure of installation and removal of a thermocouple for quick response temperature measurement is manually executed during operation at the rotating kiln. That causes many risks of injuries for the operating personnel due to the rotary movement of the kiln and is therefore no longer acceptable according to current occupational health and safety regulations.

The following work steps have to be done by the operating staff for one measurement while the kiln continues rotating:
1. Open the socket (closed with a blind cover)
2. Breakthrough of accretions (very critical step)
3. Measurement of the accretion thickness (for correct measurement depth)
4. Fixing of the bayonet fitting at the protection pipe (including thermocouple) with the damping flange
5. Installation of the protection pipe at the kiln and fixing with the bayonet fitting
6. Connection of thermocouple to measuring cable
7. Measurement of the temperature
8. Separation of thermocouple from measuring cable at the kiln shell
9. Removal of protection pipe
10. Closing the socket with the blind cover The most critical step is the breakthrough of the accretions inside the kiln. They can be very hard and thick, depending on process parameters and the position in the kiln.

Summing up, the problem during this procedure is to ensure the work safety. The operating personnel have to work at the rotating and hot kiln shell. Hot material and hot gases with high carbon monoxide content can escape from the open socket. These conditions cause a high risk of injuries and health issues.

Therefore, it is the object underlying the invention to provide a device for an in situ temperature measurement in a rotary kiln with increased safety for the operating personnel.

The invention provides a device for measuring the temperature in a rotary kiln through which material passes being heated to elevated temperatures. As the essential part of the invention the device features a drive as well as an elongated hollow body with means to fix a thermocouple. The drive and the elongated hollow body are mounted such that they rotate jointly with the rotary kiln. Further, the drive can move the elongated hollow body together with thermocouple through an opening in and out of the rotary kiln's interior for measuring the temperature inside the rotary kiln during operation.

As a result, the invention offers the advantage that no manual work has to be done at the kiln during operation, i.e. with the kiln rotating. That increases the work safety since an easy execution of the measurement procedure from the control room is possible.

Moreover, due to the less preparation work and the simpler measurement execution more measurements per time unit are possible, which leads to a better process control in the rotary kiln. Finally, the automation reduces personnel costs.

With an automated and driven device regular cleaning intervals of the measuring point can be applied. To achieve this cleaning, the elongated hollow body is moved in and out of the kiln just for breaking the accretion layer before it can lead to problems or blockages.

In addition, the whole device can be manually removed from the kiln shell and replaced by another device during short periods of interrupted kiln rotation. This makes the maintenance and repair works very easy and comfortable without long stops of the kiln.

It is preferred that the elongated hollow body is tubular and/or the thermocouple can be mounted such that its measuring tip protrudes out of the elongated hollow body. The extension of the thermocouple measuring tip out of the elongated hollow body is of particular importance for a quick response temperature measurement in the rotary kiln since it was found that the solid material in the lower part of the rotary kiln and the gas in the upper part of the rotary kiln, the so-called free board above the solid material have different temperatures. Only with a high reaction speed of the temperature measurement the exact solid material and gas temperatures can be detected within one revolution. Additionally the position of the material (dynamic angle of repose and filling degree) can be determined by a sudden change in the temperature profile during one revolution (see FIG. 5). Such a sudden change cannot be detected if the measuring tip is covered with a protective layer like the protection pipe and/or the elongated hollow body, which is why the measuring tip has to be unshielded or only very weak protected during the measurement.

In this context, it is preferred that the thermocouple is designed such that it can be moved separately from the elongated hollow body in and out of the elongated hollow body. Thereby, the elongated hollow body can be used completely separately, shielding the thermocouple measurement tip inside, to break a hole through the accretions on the inside diameter of the rotary kiln before the measurement itself is done by shifting the measuring tip of the thermocouple through the elongated hollow body by means of a mechanical actuator. In this way the measurement tip is protected from damages.

For a better breakthrough of the accretions a favorable embodiment of the invention foresees that the elongated hollow body is tapered at the side directed towards the rotary kiln.

It is also preferred that the elongated hollow body is made of heat resistant steel to ensure thermal and mechanical stability in equal measure.

Moreover, an additional protection pipe between the elongated hollow body and the thermocouple is foreseen for additional protection and stabilization of the thermocouple.

Furthermore, it is preferred that the elongated hollow body is mounted such that in the stand-by position it protects the thermocouple against wear caused by the solid material inside the rotary kiln and high temperatures/temperature changes.

In another preferred embodiment the drive for the elongated hollow body and the actuator for the thermocouple are designed as electric motors, which can be operated very easily. In a particularly preferred embodiment electrical power is supplied to the cylindrical shell of the rotary kiln by means of slip rings. In many rotary kiln applications those slip rings already exist for other purposes and can, therefore, also be used for the drive of the elongated hollow body and for the actuator of the thermocouple.

In a particularly practical design the movement of the drive is transmitted to the elongated hollow body and/or the thermocouple by means of at least one, preferably two worm wheels, driven by a worm, and moving up and down on threaded spindles. The use of two parallel spindles has the advantages of a guided movement. Using a worm and worm wheels has the advantage of an additional self-locking effect.

However, one spindle with an additional guide is also possible. The usage of another gear type, for example a rack with pinion, a coupler mechanism or hydraulic systems is feasible, too.

As discussed above, it is essential for the required short response time, that thermocouples without any protection against wear and thermal shocks are used. That causes a very low durability and limited life-time of these thermocouples. Therefore, the thermocouples have to be exchanged frequently during operation.

As per this invention, two different ways of thermocouple exchange are described:
 a) a semi-automatic solution according to which the rotary kiln has to be stopped for a very short time only and the thermocouple together with its protection pipe is exchanged manually;
 b) a fully-automatic solution according to which the exchange of the thermocouple together with its protection pipe is done by a mechanical drive installed on the kiln shell; the procedure of removal of a damaged thermocouple and installation of a new thermocouple is executed automatically during operation of the rotating kiln.

In both cases the accretions inside the rotary kiln in front of the thermocouple will be automatically broken by an elongated hollow body without any manual interaction and the thermocouple will be automatically moved between a measuring position and a stand-by position. In both cases, the rotary kiln has to be stopped to manually exchange the elongated hollow body in case of wear or damage. However, as per this invention, the elongated hollow body is fixed with a bayonet fitting for quick manual exchange.

In a preferred embodiment of the fully-automatic solution, a magazine can be foreseen to provide at least two, preferably at least six thermocouples. When one thermocouple is damaged, it will be automatically retracted inside the elongated hollow body, the magazine will be rotated by one position and a new thermocouple from the magazine will be inserted into the measurement position. So it is possible to avoid any direct manual interaction of operating personnel with the rotary kiln during operation.

Preferably, the magazine is manually exchangeable during short stoppages of the rotation of the rotary kiln. So the magazine can be replaced very fast and easy as a whole.

In a preferred embodiment the magazine is a drum magazine for a failure-free operation. Also a turret magazine is possible.

Moreover, it is preferred that the magazine is moved by a separate drive to achieve full automation, e.g. a Geneva drive. Out of the reasons discussed above, an electric motor is preferred as a drive motor for the Geneva drive.

Moreover, the invention covers a rotary kiln, characterized in that at least one device for temperature measurement according to any of claims 1 to 10 is mounted on the shell of the rotary kiln.

Thereby, the device can be retrofitted to already existing rotary kilns very easily: The semi-automatic solution can be installed at the nozzle for the manual QRT measurements and only a few modifications like the installation of the flange at the kiln shell have to be done. The fully-automatic solution is designed for the nozzles of the sampling ports. For a complete modification of an existing plant more ports are needed at the kiln shell. The initialization of the measuring procedure and other control functions can be done in the control room.

The shell temperatures are critical for this device. Additional to an insulation layer e.g. made of air chambers between base flange of the device and flange at the shell, a heat shield made of aluminum should be installed between kiln shell and flange, to protect it against thermal radiation. Furthermore a part of the air from the existing air injection fans can be taken to provide cooling air for the device. If no air injection fans exist, a new air fan can be installed to supply ambient cooling air. The fan can be driven by an electric motor also installed on the shell of the rotary kiln. The electric power for the drive can be provided by means of the slip rings also supplying electric power to the device described above.

Thereby, a thermocouple protected by an elongated hollow body is moved into the interior of the rotary kiln. The thermocouple can be positioned for measurement through the elongated hollow body by means of an actuator in such a way, that the temperature sensitive tip of the thermocouple protrudes out of the interior (hot) end of the elongated hollow body. The same actuator can also retract the thermocouple back into the elongated hollow body to provide mechanical protection of the temperature sensitive tip of the thermocouple which is also very sensitive to wear and mechanical damage. The latter position of the thermocouple inside the elongated hollow body is called the stand-by position.

It is of particular importance that the measurement covers one complete revolution of the rotary kiln as a minimum.

Additional features, advantages and possible applications of the invention are derived from the following description of exemplary embodiments and the drawings. All the features described and/or illustrated graphically here form the subject matter of the invention, either alone or in any desired combination, regardless of how they are combined in the claims or in their references back to preceding claims.

Figure 2:
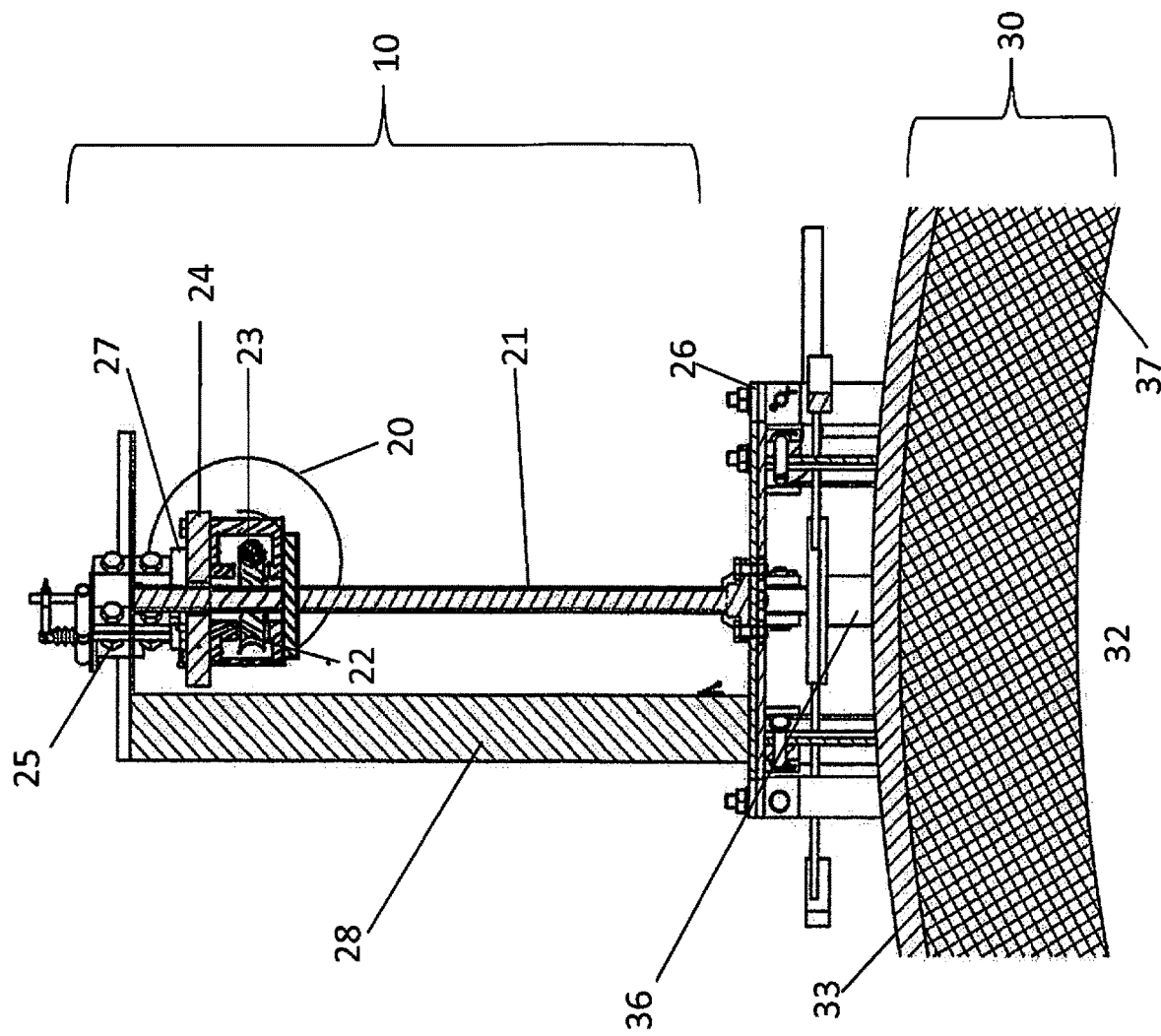
Figure 3:
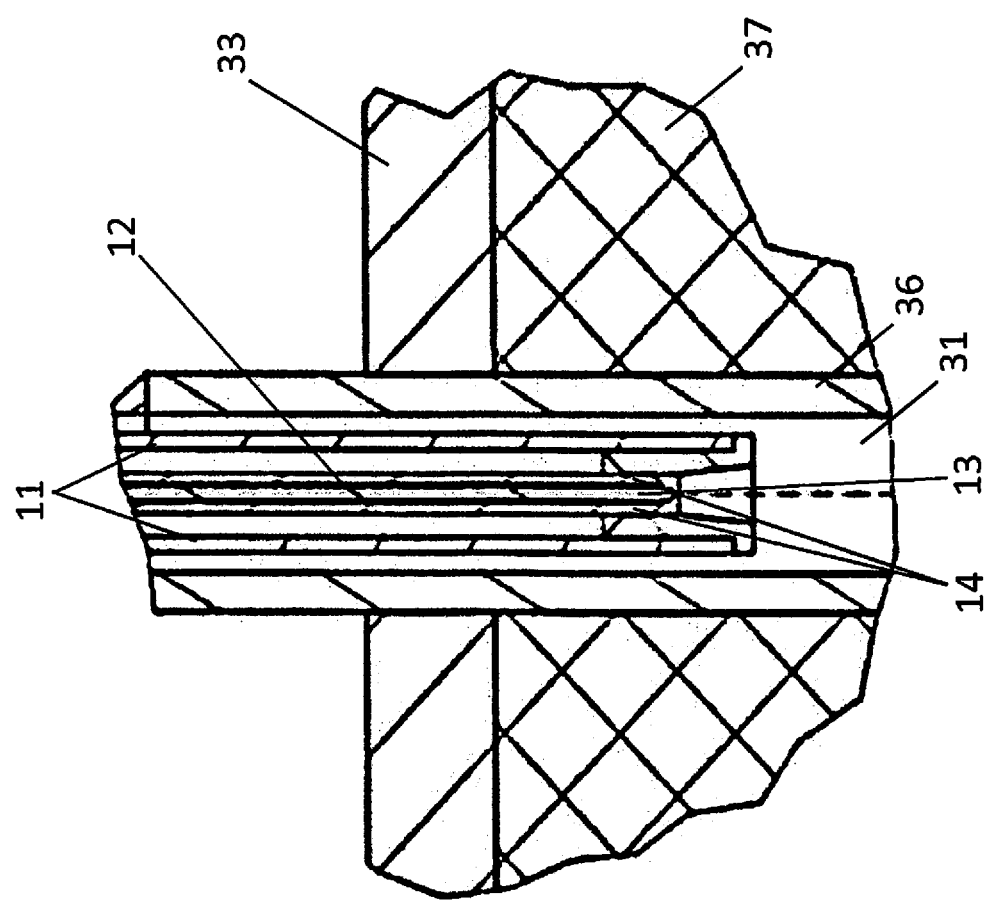
Figure 4:
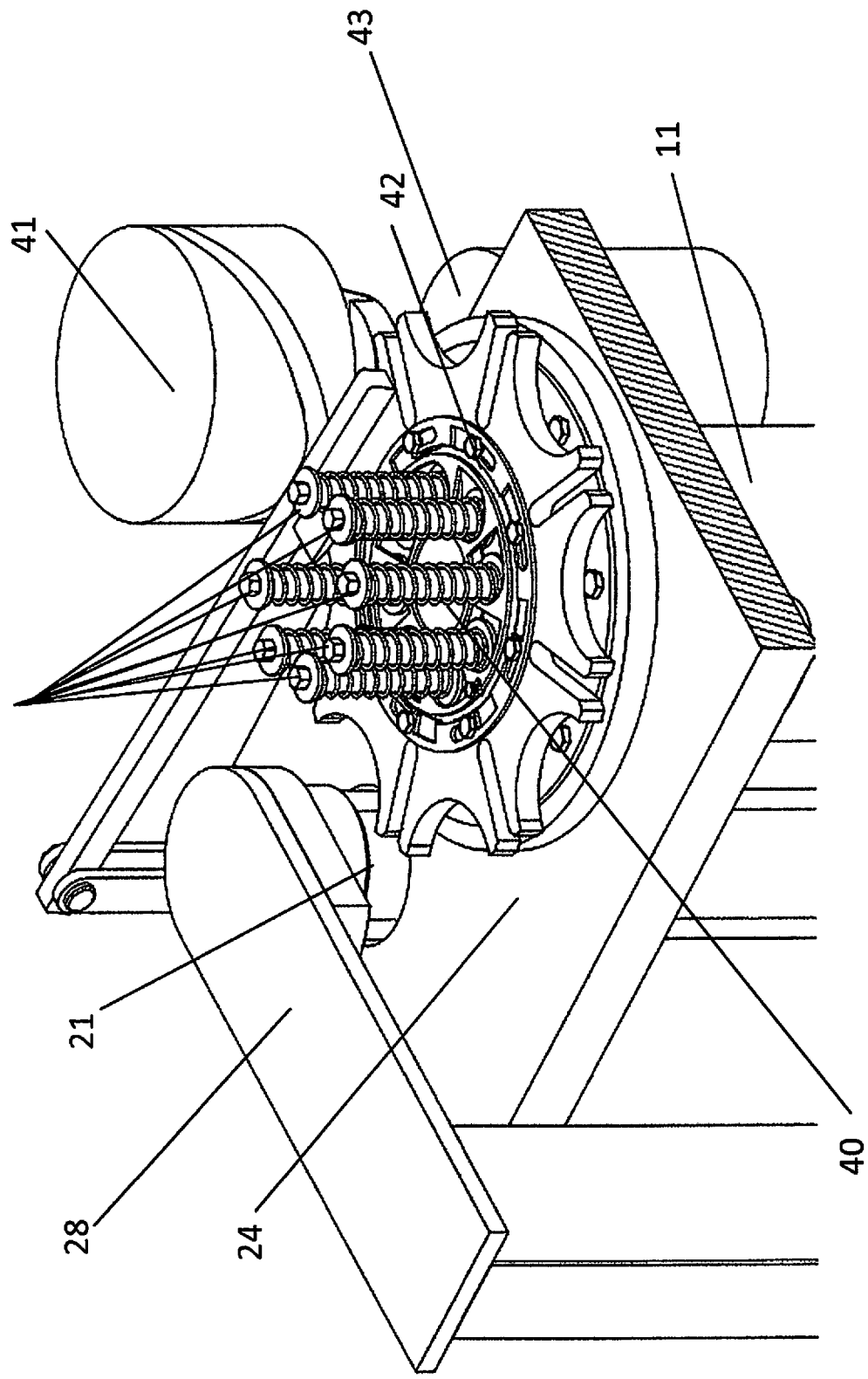
Figure 5:
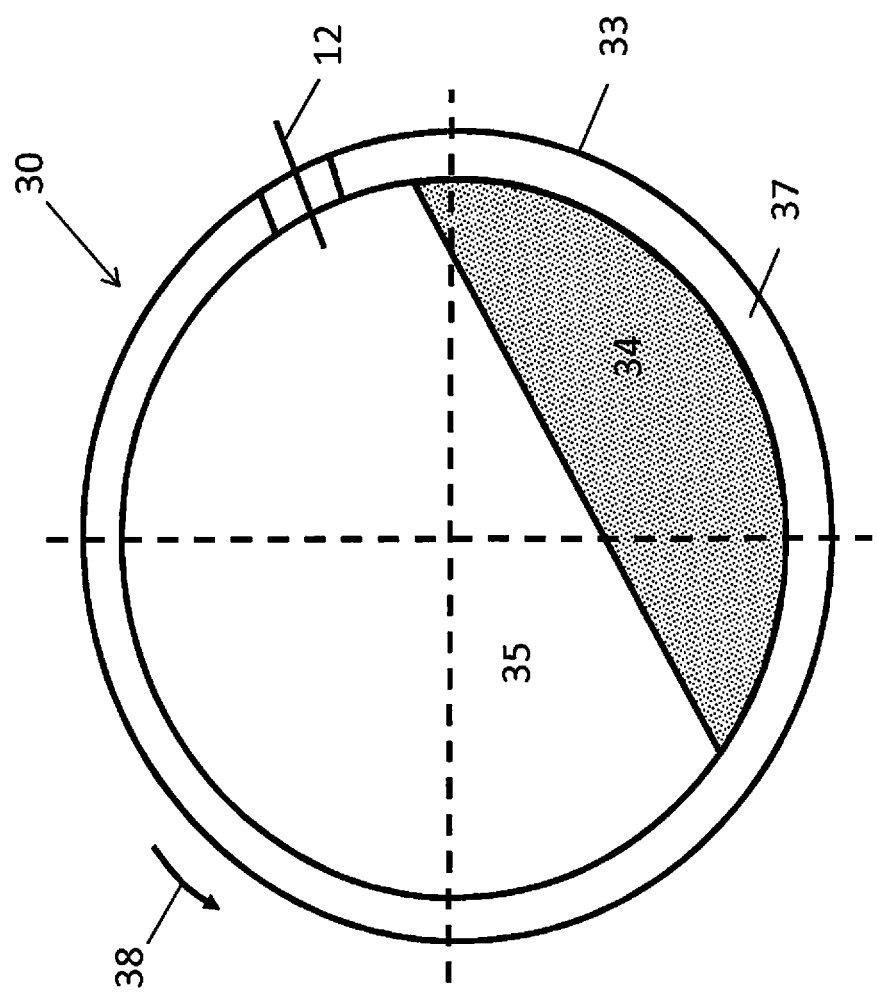
Figure 6:
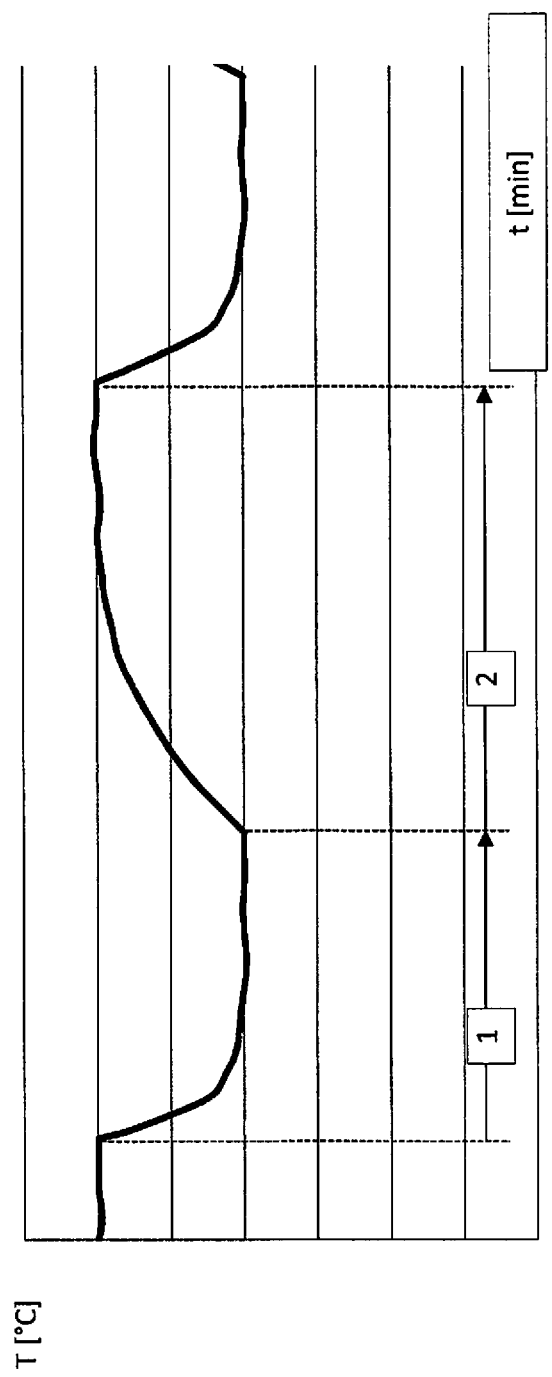

The drawings show schematically:

FIG. 1 shows schematically the semi-automatic solution as a first embodiment of the device according to the invention with two spindles and two worm wheels, FIG. 2 shows schematically a second view of the semi-automatic solution as a first embodiment of the device according to the invention with two spindles and two worm wheels, FIG. 3 shows schematically a close up of the thermocouple in the elongated hollow body in the semi-automatic solution, FIG. 4 shows schematically the fully-automatic solution as a second embodiment using a drum magazine, FIG. 5 shows schematically a section of a rotary kiln with a thermocouple inside and FIG. 6 shows schematically a temperature profile during one revolution of a rotary kiln during operation.

FIG. 1 shows a first and semi-automatic embodiment of the invention. Therein, a device 10 is installed on the rotary kiln shell 33 and executes the work steps for the temperature measurement.

In detail, a thermocouple 12 is located in an elongated hollow body 11. For a high speed of response its measuring tip 13 is either permanently outside of the elongated hollow body 11 or the thermocouple 12 can be moved separately such that its tip 13 is moved in and out of the elongated hollow body 11. The thermocouple 12 is preferably protected by a protection pipe 14, leaving the measuring tip 13 exposed to allow for the quick response to temperature changes.

For the latter case, it is preferred that the tip 13 can be positioned outside of the elongated hollow body 11 by an actuator 25 on top of the elongated hollow body 11. The actuator 25 shifts the thermocouple 12 together with the protection pipe 14. In the stand-by position the elongated hollow body 11 is located in an opening 31 in the refractory lining 37 of the rotary kiln to protect it against wear of the material and high temperatures/temperature changes. The opening 31 is protected by a sleeve 36 so that a possible displacement of the refractory lining 37 does not damage the elongated hollow body 11. Typically, the sleeve 36 is made from heat resistant steel.

Preferably, the installation and de-installation of the elongated hollow body 11 at the rotary kiln shell 33 can be done quickly, e.g. by means of a bayonet fitting. But in normal operation only the thermocouple 12 with the protection pipe 14 has to be changed occasionally.

Further, two spindles 21 are shown which are fixed, parallel to each other, at the ground flange 26 of the device 10 which in turn is mounted on a flanged nozzle on the shell of the rotary kiln 30. The spindles are supported by a frame 28, which is not shown in the figure. The worm wheels 22 with the spindle nuts are attached at the plate 24 in such a way that they are able to rotate without changing their position relative to the plate 24; they are rotated by the worm 23 which in turn is driven by the drive 20. Preferably, the drive 20 is an electric motor. The plate 24, the worm wheels 22, the worm 23 and the drive 20 move up and down the spindles 21, together with the elongated hollow body 11, the thermocouple 12 and the protection pipe 14, when the drive 20 is operated.

The elongated hollow body 11, preferably made of heat resistant steel, is fixed with a bayonet fitting to the plate 24.

This design allows a linear movement of the elongated hollow body 11 with a high force and a self-locking effect.

For the breakthrough of accretions the drive 20 moves the plate 24 and the elongated hollow body 11 through the opening 31 into the rotary kiln 30. To prevent thick accretions in front of the opening 31, this will be done in defined temporal intervals. Once the opening 31 is free of accretions, the thermocouple 12 with the protection pipe 14 can be shifted forward into the measurement position in the interior 32 of the rotary kiln by means of the actuator 25. In this measurement position the measuring tip 13 of the thermocouple 12 is not surrounded by the elongated hollow body 11 for a quick response temperature measurement According to both the semi-automatic and the fully-automatic embodiment of the invention the quick response temperature measurement is working in an automated way. When a temperature measurement is required, the automatic working procedure can be initialized in the control room. No operating personnel are needed on-site during the measurement.

FIG. 2 shows a device 10 identical to the one of FIG. 1 in a second view.

FIG. 3 shows a detail of FIGS. 1 and 2 wherein an additional protection pipe 14 in the elongated hollow body 11 supports the thermocouple 12. To achieve the stand-by position of the thermocouple 12, the protection pipe 14 can be pulled back into the tip of the elongated hollow body 11 together with the thermocouple 12. During the measurement only the measurement tip 13 of the thermocouple 12 is unprotected.

FIG. 4 discloses a fully-automatic solution for changing the thermocouples 12 together with the protection pipes 14 automatically. The principal design of this device 10 is similar to the semi-automatic solution, but the elongated hollow body 11 has a larger diameter and contains a magazine 40, e.g. a drum magazine, loaded with thermocouples 12 and protection pipes 14.

The mechanism for the automatic change of thermocouples is arranged on top of the elongated hollow body 11 and consists of a drive motor 43, a magazine drive 42, e.g. a Geneva drive, for the stepwise rotation of the magazine 40, and a mechanism 41, e.g. a cylindrical cam mechanism to convert the rotational movement of the drive motor 43 into an axial movement of the thermocouples 12.

In this embodiment of the invention a number of thermocouples 12 positioned eccentrically in the elongated hollow body, but in the bottom of the elongated hollow body there is only one eccentric hole, through which the selected thermocouple can be shifted into the measuring position. However, the opening 31 in the shell of the rotary kiln 30 and its refractory lining 37 is concentric to the centerline of the elongated hollow body 11.

In the stand-by position of the elongated hollow body 11 a round steel bar seals the eccentric opening in the bottom of the elongated hollow body 11. To start a measurement, the elongated hollow body 11 is first moved by means of the drive 20 into the interior 32 of the rotary kiln 30 to break any accretions and then the thermocouple changing mechanism 41 and 42 positions a thermocouple 12 through the eccentric opening in the bottom of the elongated hollow body 11 into its measuring position in the interior of the rotary kiln. In case of a defect thermocouple 12, the mechanism stops at the next position of the magazine 40. If all thermocouples 12 are defect, the magazine 40 can be changed manually.

In a preferred embodiment of the invention the change of a thermocouple is only affected when the opening 31 is not filled with solid material, i.e. the device 10 is in a high position, e.g. as shown in FIG. 4.

FIG. 5 depicts a section of a rotary kiln 30 with a thermocouple 12 protruding inside. The rotary kiln features a gas phase 35 and is partially filled with solid particles 34. The solid particles 34 do not rotate together with the rotary kiln 30, but always remain in the shown position. So during one revolution of the rotary kiln 30 in the direction of rotation 38 the thermocouple 12 is first measuring the temperature of the gas phase and then the temperature of the solid particles.

FIG. 6 shows schematically a temperature profile during one revolution of the rotary kiln during operation. As it can be seen, sudden temperature changes are measured when the thermocouple is immersed into the solid particles and when it emerges from the solid particles.

To determine the thickness of the accretion layer in the kiln, a change in the temperature profile during movement of the elongated hollow body 11 into the kiln will be used. Therefore, the accretions in front of the opening 31 are broken and the actuator 25 has positioned the thermocouple in measurement position. The temperature change during moving in of the elongated hollow body with the measuring tip 13 in measuring position is caused by a higher heat transfer outside the accretion layer because of the gas velocity and the thermal radiation in the kiln. With the information of the accretion thickness, the elongated hollow body can be positioned accordingly by means of the drive 20, and the measurement can start.

Alternatively the temperature gradient between temperature from the kiln inside and from the shell temperature can be used for a determination of the accretion thickness.

LIST OF REFERENCE NUMERALS

10 device
11 elongated hollow body
12 thermocouple
13 thermocouple measurement tip
14 protection pipe
20 drive
21 spindle
22 worm wheel
23 worm
24 plate
25 actuator
26 ground flange
27 bayonet fitting
28 frame
30 rotary kiln
31 opening
32 rotary kiln interior
33 rotary kiln shell
34 solid particles
35 gas phase
36 sleeve
37 refractory lining
38 direction of rotation
40 magazine
41 cylindrical cam mechanism
42 Geneva drive
43 drive motor

The invention claimed is:

1. A device for measuring the temperature in a rotary kiln through which solid material passes being heated to elevated temperatures, comprising a drive as well as an elongated hollow body having a thermocouple supported therein, whereby the drive and the elongated hollow body are mounted such that they rotate jointly with the rotary kiln and that the drive can move the elongated hollow body together with the thermocouple through an opening in and out of the rotary kiln interior for measuring the temperature inside the rotary kiln during operation, wherein
   the elongated hollow body is tubular and the thermocouple is configured to be shifted by an actuator such that a temperature sensitive tip of the thermocouple protrudes out of the elongated hollow body;
   the thermocouple is designed such that it can be moved separately from the elongated hollow body in and out for better protection of the thermocouple;
   a magazine providing at least the thermocouple and another thermocouple and/or the elongated hollow body and at least another elongated hollow body.

2. The device according to claim 1, wherein the elongated hollow body is tapered at the side directed to the rotary kiln.

3. The device according to claim 1, wherein the drive is an electric motor.

4. The device according to claim 1, wherein a protection pipe is provided between the elongated hollow body and the thermocouple.

5. The device according to claim 1, wherein the movement of the drive is transmitted to the elongated hollow body and/or the thermocouple by means of at least one worm wheel.

6. The device according to claim 1, wherein the magazine is exchangeable.

7. The device according to claim 1, wherein the magazine is a drum magazine.

8. The device according to claim 1, wherein the magazine is rotated by a Geneva drive.

9. A rotary kiln, wherein at least one device for temperature measurement according to claim 1 is mounted of the rotary kiln.

10. A method for temperature measurement in a rotary kiln, characterized in that temperature measured with a device according to claim 1.

11. A method according to claim 10, wherein the actuator is rotated such that a time duration of one temperature measurement is at least the time needed for one revolution of the rotary kiln.

* * * * *